US009002126B2

(12) United States Patent
Maurer et al.

(10) Patent No.: US 9,002,126 B2
(45) Date of Patent: Apr. 7, 2015

(54) LIMITED ERROR RASTER COMPRESSION

(75) Inventors: Thomas Maurer, Redlands, CA (US); Peng Gao, Redlands, CA (US); Peter Becker, Redlands, CA (US)

(73) Assignee: Environmental Systems Research Institute (ESRI), Redlands, CA (US)

( * ) Notice: Subject to any disclaimer, the term of this patent is extended or adjusted under 35 U.S.C. 154(b) by 186 days.

(21) Appl. No.: 13/464,854

(22) Filed: May 4, 2012

(65) Prior Publication Data

US 2013/0294706 A1   Nov. 7, 2013

(51) Int. Cl.
*G06T 9/00* (2006.01)
*H04N 19/119* (2014.01)

(52) U.S. Cl.
CPC ............... *G06T 9/00* (2013.01); *H04N 19/119* (2014.11)

(58) Field of Classification Search
None
See application file for complete search history.

(56) References Cited

U.S. PATENT DOCUMENTS

| | | | |
|---|---|---|---|
| 5,245,679 A | 9/1993 | Rosenberg | |
| 5,799,110 A | 8/1998 | Israelsen et al. | |
| 5,905,819 A * | 5/1999 | Daly | 382/284 |
| 6,072,496 A | 6/2000 | Guenter et al. | |
| 6,115,421 A * | 9/2000 | Katta et al. | 375/240 |
| 6,339,658 B1 | 1/2002 | Moccagatta et al. | |
| 6,687,411 B1 | 2/2004 | Miura et al. | |
| 6,748,323 B2 | 6/2004 | Lokshin et al. | |
| 6,792,151 B1 | 9/2004 | Barnes et al. | |
| 6,795,583 B1 | 9/2004 | Barnes et al. | |
| 6,912,317 B1 | 6/2005 | Barnes et al. | |
| 6,977,738 B2 | 12/2005 | Wood et al. | |
| 6,983,074 B1 | 1/2006 | Clausen et al. | |
| 7,050,639 B1 | 5/2006 | Barnes et al. | |
| 7,092,572 B2 | 8/2006 | Huang et al. | |
| 7,430,340 B2 | 9/2008 | Glass et al. | |
| 7,454,069 B2 | 11/2008 | Kodama et al. | |
| 8,537,896 B2 * | 9/2013 | Tanaka et al. | 375/240.16 |
| 2002/0012471 A1 | 1/2002 | Nayyar et al. | |
| 2008/0069458 A1 | 3/2008 | Vega-Higuera et al. | |

(Continued)

FOREIGN PATENT DOCUMENTS

EP   1345449 A1   9/2003

OTHER PUBLICATIONS

Bao et al. "Context modeling based depth image compression for distributed virtual environment," Proceedings of the 2003 International Conference on Cyberworlds pp. 174-180 (Dec. 2003).

(Continued)

*Primary Examiner* — Tsung-Yin Tsai
(74) *Attorney, Agent, or Firm* — Kilpatrick Townsend & Stockton LLP

(57) ABSTRACT

Embodiments of the invention relate to an image or raster compression method that includes receiving pixel data for a raster comprising a two dimensional (2D) array of pixels where each pixel is associated with a data value. The method further includes receiving a user defined parameter defining a maximum error allowable per pixel for a compression algorithm. The raster can be divided into a number of pixel blocks where each pixel can be quantized and bit stuffed based on a number of block statistics including the maximum error allowable. The method further includes executing the compression algorithm wherein for each pixel, where an error caused by the compression algorithm is equal to or less than the maximum error allowable, and encoding the pixel data based on the compression algorithm. In certain embodiments, the compression algorithm is a non-transform compression algorithm.

10 Claims, 12 Drawing Sheets

(56) References Cited

U.S. PATENT DOCUMENTS

| | | |
|---|---|---|
| 2008/0131014 A1* | 6/2008 | Lee et al. .................... 382/251 |
| 2008/0292168 A1 | 11/2008 | Winkelmann |
| 2010/0060629 A1 | 3/2010 | Rasmusson et al. |
| 2010/0061626 A1 | 3/2010 | Ben-Moshe et al. |
| 2011/0026597 A1* | 2/2011 | Tanaka et al. ............ 375/240.16 |
| 2011/0235928 A1 | 9/2011 | Strom et al. |
| 2011/0292995 A1* | 12/2011 | Kubota .................... 375/240.02 |

OTHER PUBLICATIONS

Chen et al. "A Synthesis-Quality-Oriented Depth Refinement Scheme for MPEG Free Viewpoint Television (FTV)," , 2009. ISM '09. 11th IEEE International Symposium on Multimedia, pp. 171-178 (Dec. 2010).

Lee et al. "Low-complexity near-lossless image coder for efficient bus traffic in very large size multimedia," 2009 16th IEEE International Conference on Image Processing (ICIP), pp. 2329-2332 (Nov. 2009).

Lok et al. "Low latency universal buffer compression and decompression for mobile graphics applications," 2010 IEEE International Conference Multimedia and Expo (ICME), pp. 814-819 (Jul. 2010).

Wang et al. "Region Based Rate-Distortion Analysis for 3D Video Coding," 2010 Data Compression Conference (DCC), p. 555 (Mar. 2010).

* cited by examiner

One Tile Featuring Uniform Size Blocks

Multiple Tiles Featuring Multiple Size Blocks

| LERC File Structure |
| --- |
| File Header |
| Mask Header |
| Mask Data |
| Pixel Values Header |
| Pixel Values Data |

*FIG. 8A*

| LERC File Header | | |
| --- | --- | --- |
| Item | Format | Size |
| File Identifier String | Char[10] | 10 |
| File Version | Int | 4 |
| Image Type | Int | 4 |
| Image Height in Pixel | Long | 4 |
| Image Width in Pixel | Long | 4 |
| MaxZError | Double | 8 |

*FIG. 8B*

| LERC Mask or Pixel Values Header | | |
|---|---|---|
| Item | Format | Size |
| No. of Blocks, Vertical | Long | 4 |
| No. of Blocks, Horizontal | Long | 4 |
| Data Size in Bytes | Long | 4 |
| Max Value in Image | Float | 4 |

*FIG. 8C*

| LERC Block Header | | |
|---|---|---|
| Item | Format | Size |
| Encoding Type (bits 0-5) | Byte | 1 |
| Value = 0: uncompressed float | | |
| Value = 1: bit stuffed | | |
| Value = 2: all 0 (encode only this byte) | | |
| Value = 3: all constant (encode only header) | | |
| For 0 and 2, the rest of header is skipped | | |
| Bits 6-7 encode next type | | |
| Offset | Float or short or char | 4 or 2 or 1 |
| No. of bits per Pixel (bits 0-5) | Byte | 1 |
| Bits 6-7 encode the next type | | |
| No. of valid pixels | Byte or unsigned short or unsigned long | 1 or 2 or 4 |

*FIG. 8D*

| 1234.1234 | 1241.8741 | 1256.2759 | 1267.2950 |
| --- | --- | --- | --- |
| 1280.8725 | 1248.2917 | 1272.7511 | 1279.3802 |
| void | 1222.2943 | 1239.3072 | void |
| 1264.9720 | 1250.0852 | void | void |

910 ◢ *FIG. 9A*

| 591 | 979 | 1699 | 2250 |
| --- | --- | --- | --- |
| 2929 | 1300 | 2523 | 2854 |
| void | 0 | 851 | void |
| 2134 | 1390 | void | void |

*FIG. 9B* ◥ 920

| Item | Value | Size |
| --- | --- | --- |
| Encoding Type (bits 0-5). Bits 6-7 encode the next type | 1 | 1 |
| Offset | 1222.2943 | 4 |
| Number of bits per pixel (bits 0-5). Bits 6-7 encode the next type | 12 | 1 |
| Number of valid pixel | 12 | 1 |

930 ◢ *FIG. 9C*

| 6 | 10 | 17 | 23 |
| --- | --- | --- | --- |
| 29 | 13 | 25 | 29 |
| void | 0 | 9 | void |
| 21 | 14 | void | void |

940 ◢ *FIG. 9D*

| Item | Value | Size |
| --- | --- | --- |
| Encoding Type (bits 0-5). Bits 6-7 encode the next type | 1 | 1 |
| Offset | 1222.2943 | 4 |
| Number of bits per pixel (bits 0-5). Bits 6-7 encode the next type | 5 | 1 |
| Number of valid pixel | 12 | 1 |

950 ◢ *FIG. 9E*

LIMITED ERROR RASTER COMPRESSION

CROSS-REFERENCES TO RELATED APPLICATIONS

Not Applicable

BACKGROUND OF THE INVENTION

Conventional topographical surface mapping technologies that have been used to create elevation rasters, maps, and images, tend to approximate the surface of the earth relatively coarsely. For example, DTED-2 (Digital Terrain Elevation Data) format can use spatial resolutions (i.e., different cell sizes) of 30×30 meters with a vertical resolution of 1 meter. The data is typically stored as a 16 bit integer raster (−32 km−+32 km), which provides enough range to represent any point on earth, but not a high enough resolution to map many above ground features (i.e., trees, buildings, etc.) due to the large cell sizes.

Contemporary surface mapping systems can provide highly detailed images with cell sizes smaller than one square meter and vertical resolutions below 1 cm. These systems can create images rich in detail and content including buildings, cars, brush, trees, or other surface features given the small cell size and shallow vertical resolution. As a result, these images can result in very large data files that render conventional compression technologies (e.g., LZW) ineffective. In many modern systems, users have the choice between lossless compression (e.g., LZW) on the one hand, which can be ineffective on high detail, highly noisy data, and lossy compression methods (e.g., jpg) on the other hand, which can produce arbitrarily large compression errors for a single pixel. Better compression methods are needed that can be lossy, and provide adequate compression ratios for contemporary high resolution raster files.

SUMMARY OF THE INVENTION

Embodiments of the invention related to a compression method including receiving pixel data representing a two dimensional array of pixels, where each pixel is associated with a data value and receiving a first user defined parameter defining a maximum error allowable per pixel for a compression processing routine. The method can further include executing the compression processing routine, where the data value for each pixel is compressed using the compression processing routine, and where an error caused by the compression processing routine is equal to or less than the maximum error allowable, and encoding the pixel data based on the compression processing routine. In some cases, the pixel data can be larger than 8 bit, and can be at least one of scientific data, elevation data, or satellite imagery, etc.

In some embodiments, the compression processing routine can be a no transform compression processing routine that includes quantizing the pixel data into an array of unsigned integer values, and bit stuffing the array of unsigned integers into a byte array. The method also includes dividing the 2D array of pixels into pixel blocks, where encoding the pixel data further includes encoding each of the pixel blocks. Dividing the 2D array of pixels into pixel blocks can further include determining a set of statistics from each block, where the set of statistics includes a maximum and minimum value in each block and a number of valid pixels in each block, and computing the number of bytes required to maximally compress each of the blocks based on the set of statistics. In some cases, the encoding of each of the blocks occurs only once.

Certain embodiments of the invention are related to a non-transitory computer-readable storage medium including a plurality of computer-readable instructions tangibly embodied on the computer-readable storage medium, which, when executed by a data processor, provides a lossy compression method, the plurality of instructions including instructions that cause the data processor to receive pixel data representing a two dimensional array of pixels, wherein each pixel is associated with a data value and receive a first user defined parameter defining a maximum error allowable per pixel for a compression processing routine. Further embodiments can include instructions that cause the data processor to execute the compression processing routine (e.g., an algorithm), where the data value for each pixel is compressed using the compression processing routine, and where an error caused by the compression processing routine is equal to or less than the maximum error allowable. Yet further embodiments can include instructions that cause the data processor to encode the pixel data based on the compression processing routine. In some cases, the pixel data can be at least 8 bit or larger, and can be at least one of scientific data, elevation data, or satellite imagery, etc.

BRIEF DESCRIPTION OF THE DRAWINGS

FIG. 8A depicts a LERC file structure, according to an embodiment of the invention.

FIG. 8B depicts a LERC file header, according to an embodiment of the invention.

FIG. 8C depicts a LERC mask or pixel values header, according to an embodiment of the invention.

FIG. 8D depicts a LERC block header, according to an embodiment of the invention.

FIG. 9A depicts sample block data for a 4×4 block of pixels, according to an embodiment of the invention.

FIG. 9B depicts quantized sample block data for a 4×4 block of pixels, according to an embodiment of the invention.

FIG. 9C depicts a sample block header, according to an embodiment of the invention.

FIG. 9D depicts quantized sample block data for a 4×4 block of pixels, according to an embodiment of the invention.

FIG. 9E depicts a sample block header, according to an embodiment of the invention.

DETAILED DESCRIPTION OF THE INVENTION

Embodiments of the invention can include a Limited Error Raster Compression (LERC) method that includes receiving pixel data for a raster comprising an array of three-dimensional point data where each pixel is associated with a data value. The method further includes receiving a user defined parameter defining a maximum error allowable for a compression algorithm. The raster can be divided into a number of pixel blocks where each pixel can be quantized and bit stuffed based on a number of block statistics including the maximum error allowable. The method further includes executing the compression algorithm wherein for each pixel, where an error caused by the compression algorithm is equal to or less than the maximum error allowable, and encoding the pixel data based on the compression algorithm.

In some instances, raster data with very large pixel depth (e.g., more than 8 bit per pixel) can comprise very large data files, which can be difficult to transfer or process in real-time. For example, 8-bit data can include numbers ranging from 0-255, 16-bit data can include numbers ranging from 0-65535, and so on, for each individual pixel of a given raster. Typically, lossless compression methods try to assign smaller codes to symbols with higher occurrences, and larger codes to symbols with fewer occurrences. This can be problematic when there are large numbers of different data values which may result in overall lossless compression factors at 2× or less.

Figure 1A:
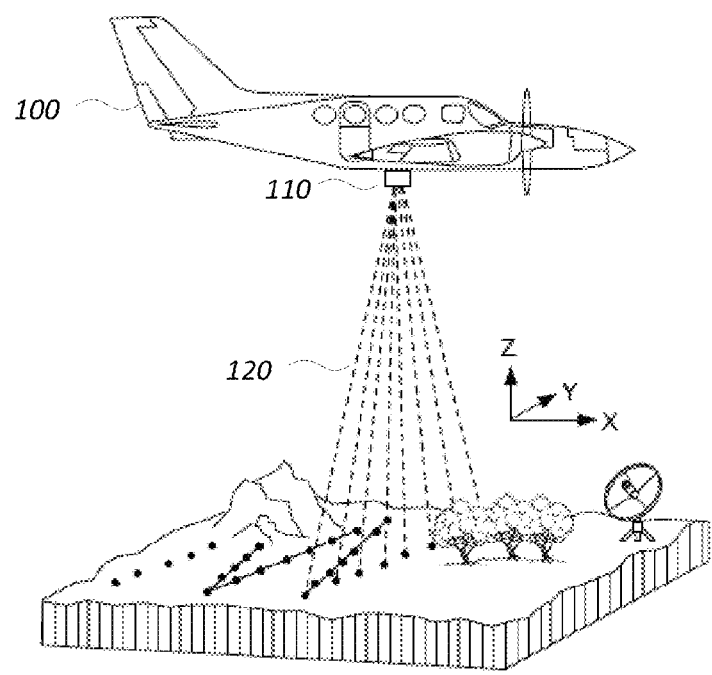
FIG. 1A depicts an aircraft utilizing LiDAR technology to scan and survey the terrain below.

Raster data can include scientific raster data (e.g., temperature, biomass production, evaporation, transpiration, air pressure, etc.), multi-spectral imagery, or elevation raster data (e.g., 2D raster with elevation data in each cell), or the like, which can be derived from 3D point cloud data. One example of three-dimensional point cloud data includes Light Detection and Ranging (LiDAR) data. LiDAR is an optical remote sensing technology that can measure the distance to a target by illuminating the target with light (e.g., pulses from a laser), which can be used to map physical features (e.g., geographic, microscopic, etc.) with very high resolution. LiDAR technology can be fitted to aircraft or satellites for surveying and mapping geographic areas. FIG. 1A depicts an aircraft 100 utilizing LiDAR technology to scan and survey the terrain below. The data is collected by a laser unit 110 attached to the aircraft that emits pulses toward the ground in a sweeping pattern 120. The laser unit 110 receives the reflections and generates a very highly detailed 3D point cloud raster (i.e., map) of the terrain below, with image resolutions that can far surpass the capabilities of earlier technologies. The LiDAR data files are typically very large, making real-time streaming high resolution data problematic over bandwidth limited mediums.

Figure 1B:
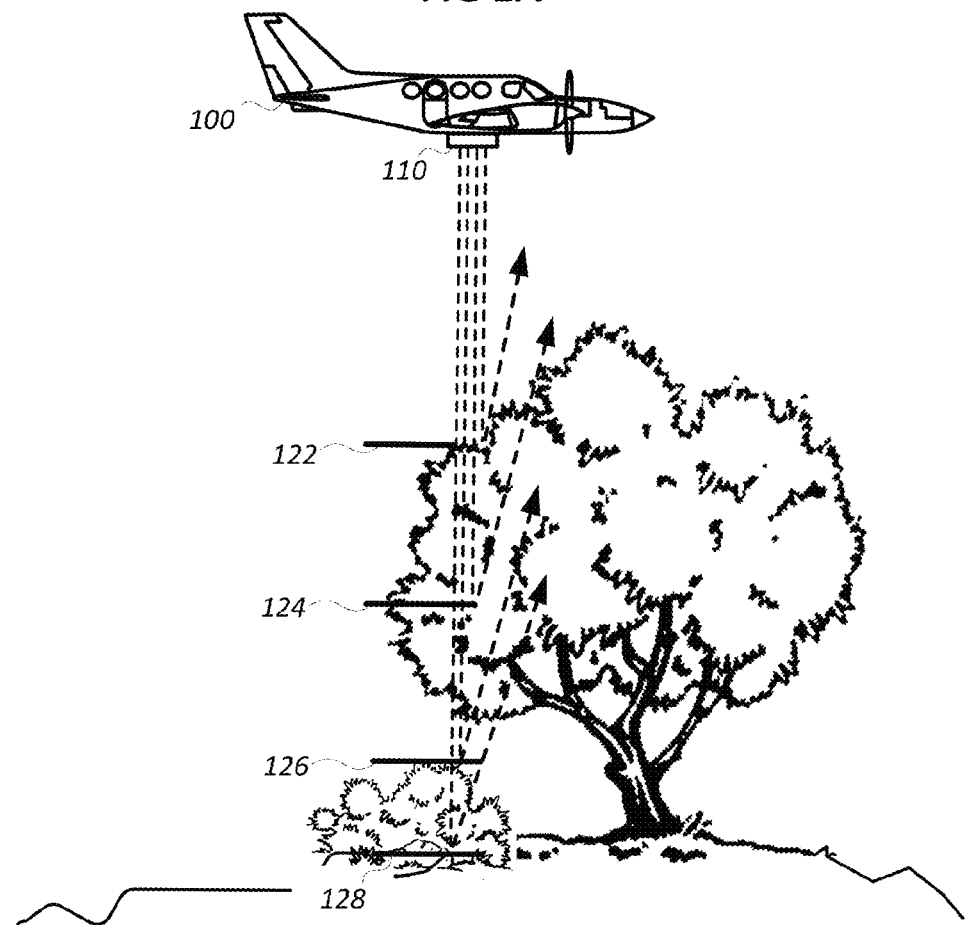
FIG. 1B depicts an aircraft utilizing LiDAR technology and receiving multiple reflections from a single set of planar coordinates.

The raw output from a LiDAR system can be a 3D point cloud, which can be a cluster of points in 3D space with coordinates [x, y, z]. Those points can be stored in LAS files, which are a public format allowing the exchange of LiDAR data between the organizations and companies who produce this data and those who consume it. Note that for a point cloud, there can be multiple points on top of each other, having the same [x, y] coordinates but different [z] coordinates. To illustrate, FIG. 1B depicts an aircraft 100 utilizing LiDAR technology 110 and receiving multiple reflections (122, 124, 126, 128) from a single set of planar coordinates. A single laser pulse can result in multiple returns, which may return at different intervals. For example, the first return 122 can be from a leaf at the top of a tree, while the last return 126 can be from the reflection of the laser pulse off of the ground. From the travel time of the pulse and the 3D position of the LiDAR unit on the plane (GPS), the laser pulse reflection points can be measured with an accuracy on the order of centimeters, depending on multiple factors such as the height of the plane and the accuracy of the LiDAR measurements. Additionally, each point (i.e., coordinate) can have a flag attached (e.g., 1st, 2nd, . . . , last return, with classification flags (as computed by classification algorithms) such as ground, water, building, etc.). From the flagged data points, different elevation surfaces can be individually reconstructed. For instance, bare earth or ground surface (buildings and trees are removed) can be reconstructed by using 3D points that have the "ground" flag set. In some cases, this surface will initially have holes or void areas where other features (e.g., trees, buildings, etc.) were. Similarly, a tree canopy surface can be reconstructed by using 3D points that have a "first return" flag set. In some embodiments, these surface rasters can be computed using either binning (e.g., aggregation of all points in each raster cell based on their average or maximum value per cell), triangulation (i.e., interpolation between measured points), or other method known by those skilled in the art.

There are a variety of ways to derive a 3D map or elevation raster from a 3D point cloud. In one non-limiting example, the 3D point cloud is overlaid with a regular [xy] grid and all of the points in each grid cell are combined into one value, as described above. This can be done by computing the average [z] or height of all points in each cell. Alternatively, the minimum or maximum [z] can be used. Furthermore, all points can be connected to create a mesh using triangulation, where an intersection is made at the cell centers resulting is one [z] value per grid cell. Further still, one can define which points of the entire 3D point cloud should be included in this process. For example, this might be limited to points labeled as "ground," "vegetation," "buildings," etc., as described above. It should be noted that in certain embodiments of the compression method described herein, it is assumed that the 3D LiDAR point cloud has already been converted into one elevation raster using any of the previously mentioned methods or other methods known by those of ordinary skill in the art. In short, the compression method described herein starts with a raster or an image with N rows, M columns, and one z or elevation value for each grid cell.

Figure 3:
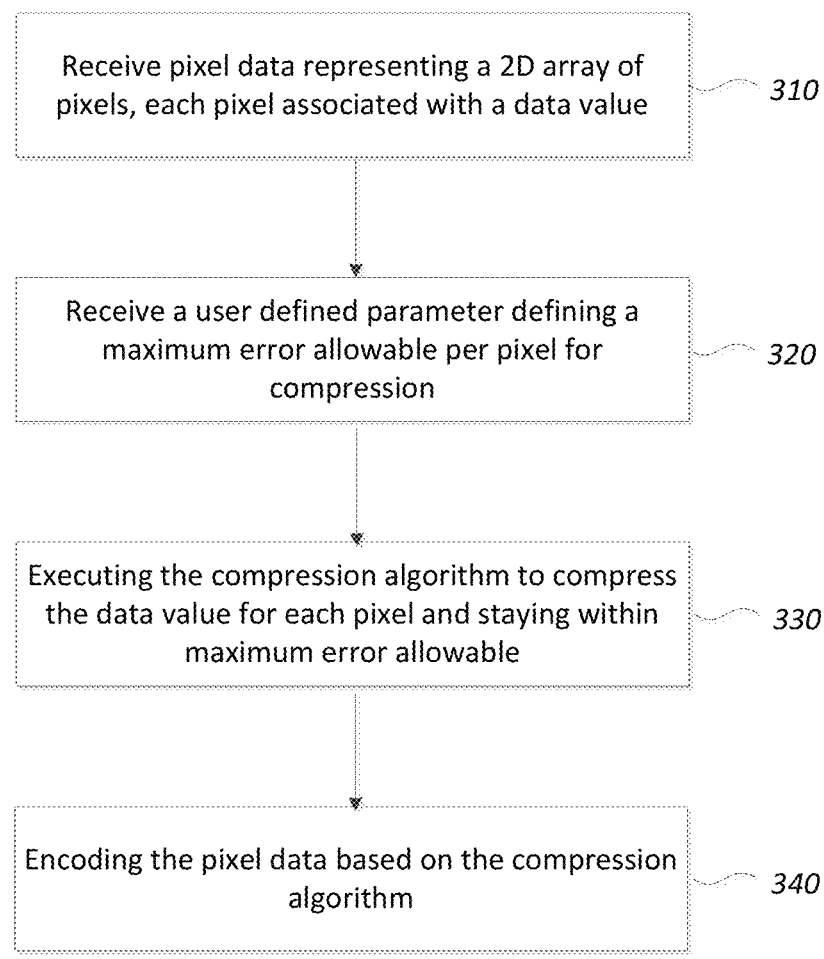
FIG. 3 depicts a simplified flow diagram illustrating aspects of a method of compression, according to embodiments of the invention.

FIG. 3 depicts a simplified flow diagram illustrating aspects of a method 300 of compression, according to embodiments of the invention. The LERC method 300 includes receiving pixel data representing a two-dimensional array of pixels, where each pixel is associated with a data value (310). In some embodiments, the raster data can include scientific raster data (e.g., temperature), multi-spectral imagery, elevation raster data (i.e., 2D raster with elevation data in each pixel/cell), and the like. As described above, raster data can have a large pixel depth (e.g., more than 8 bit per pixel), which can be difficult to compress using conventional lossless methods.

Figure 2A:
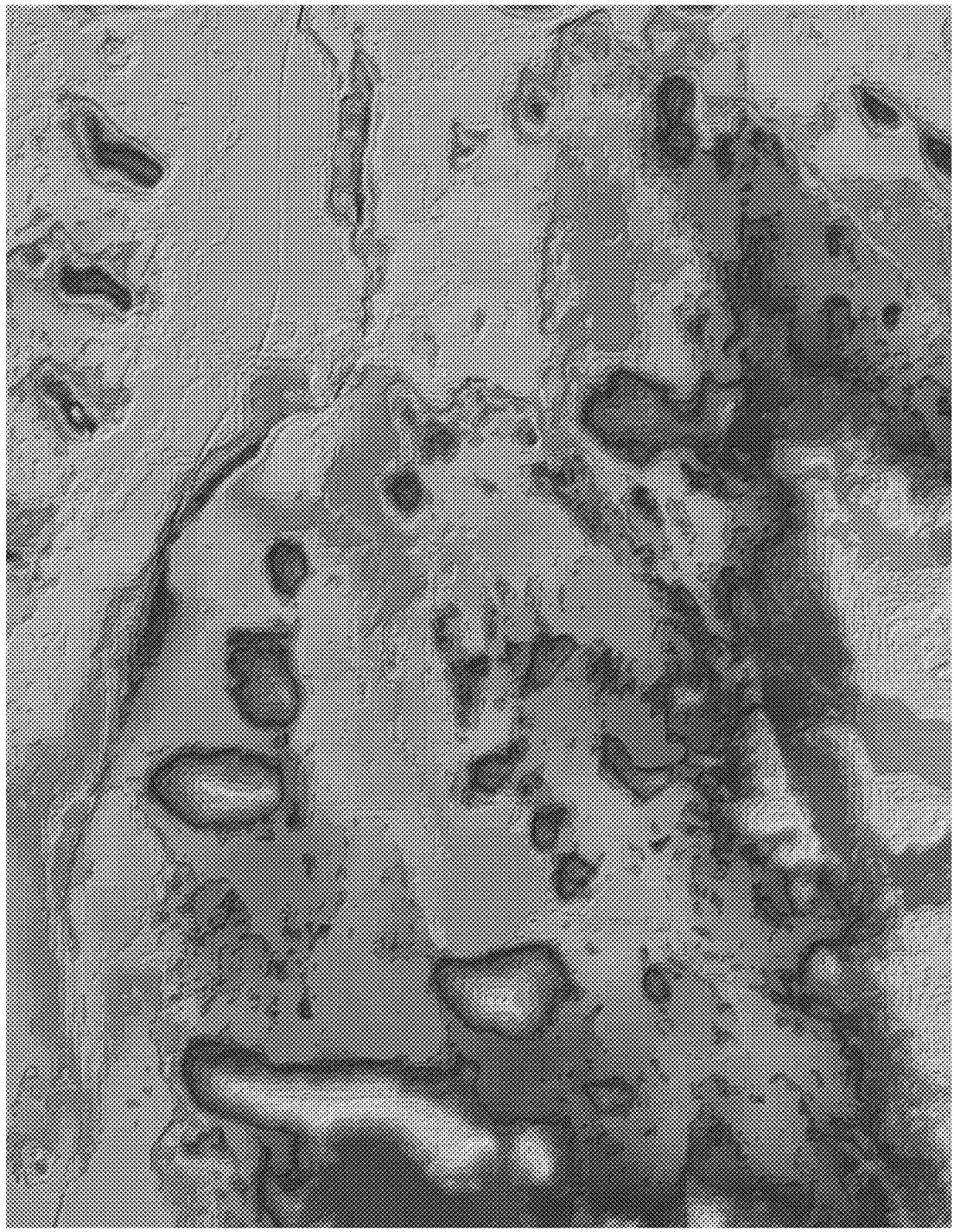
FIG. 2A illustrates a LiDAR-generated elevation raster depicting a landscape with a MaxZError threshold of 1 meter.
Figure 2B:
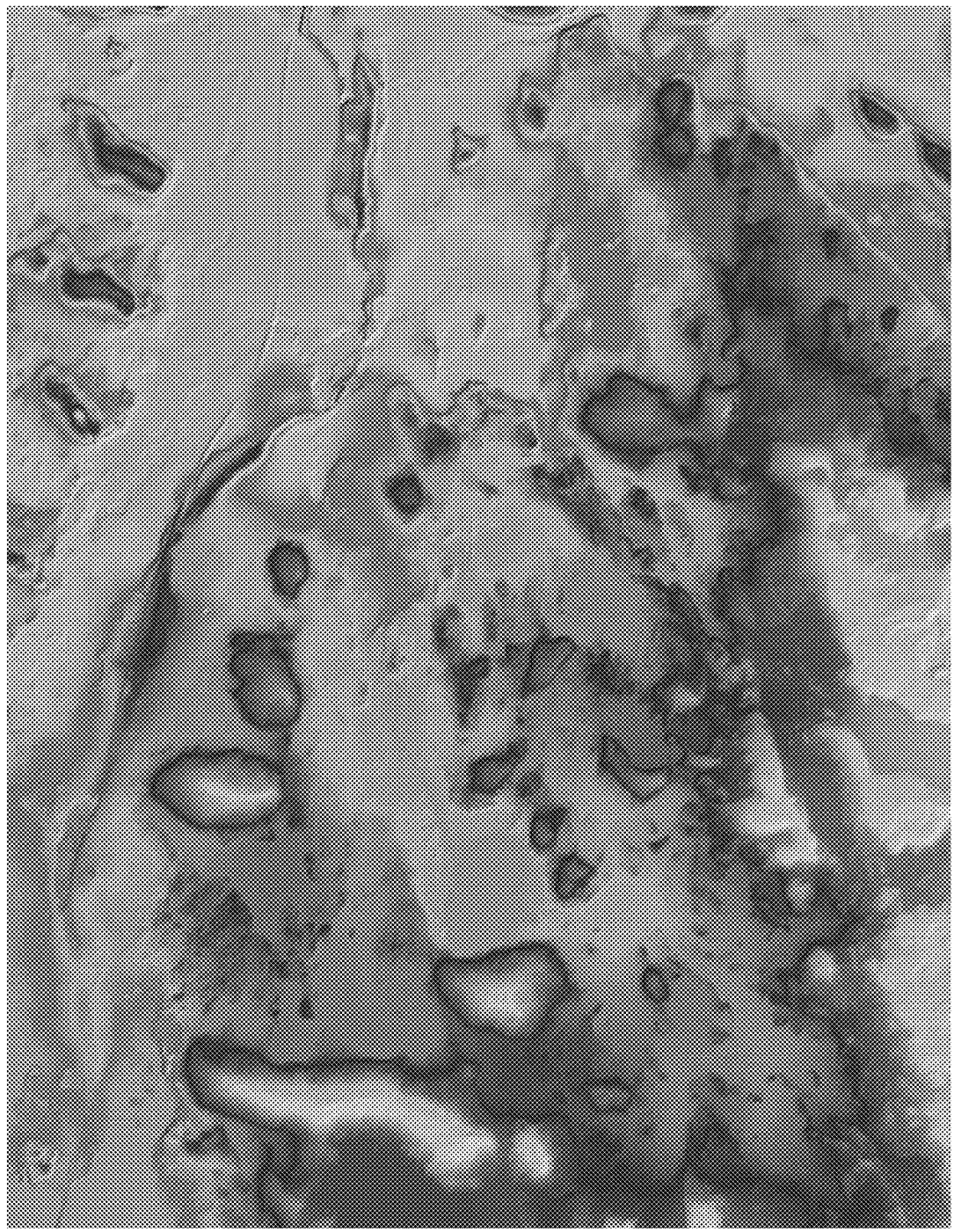
FIG. 2B illustrates a LiDAR-generated elevation raster depicting a landscape with a MaxZError threshold of 10 centimeters.

At 320, the method includes receiving a user defined maximum error (i.e., "MaxZError") allowable per pixel. The MaxZError value determines the amount of error introduced when quantizing pixel data values during compression, as further discussed below with respect to FIG. 4. The user can select a maximum allowable error based on a desired data precision. Allowing greater error will typically yield greater compression ratios and reduced file sizes. For example, a maximum error of 0.1 cm in the z-direction can have significantly less error (and a greater file size) than a maximum allowable error of 1 meter. Lower MaxZError values also produces, for example, elevation rasters with higher precision than higher MaxZError values. For example, FIG. 2A illustrates a LiDAR-generated elevation raster depicting a landscape with a MaxZError value (i.e., threshold) of 1 meter. FIG. 2B illustrates the same landscape with a MaxZError of 10 cm. Where FIG. 2A shows "blocky" or step-like gradients in mountainous regions, FIG. 2B shows those same features with a much smoother gradient because of the smaller error introduced during compression. In these examples, the compression ratios achieved are 24.2 for FIG. 2a and 8.5 for FIG. 2b, in contrast to compression ratios as low as 1.7 when using standard lossless LZW compression. In addition, LERC encoding speed can be approximately 10× faster than LZW or more. It should be noted that although many examples herein refer to the pixel data value as a vertical displacement (z-axis), the pixel data value can be any type of data including temperature, force, mass, luminescence, or any other desired parameter that would apply to any raster, data, and the like.

At 330, the method includes executing the compression algorithm to compress the data value for each pixel within the user defined maximum error. In other words, the data value for each pixel can be maximally compressed while maintaining a quantization error below the user defined maximum (i.e., MaxZError). The method further includes encoding the pixel data based on the output of the compression algorithm (340). The compression algorithm (i.e., processing routine) can be a no-transform compression processing algorithm. It should be noted that the compression algorithms described herein do not include discrete cosine transforms (DCT) or wavelet transforms. The individual steps that comprise the compression algorithm are further described below with respect to FIG. 4.

Figure 4:
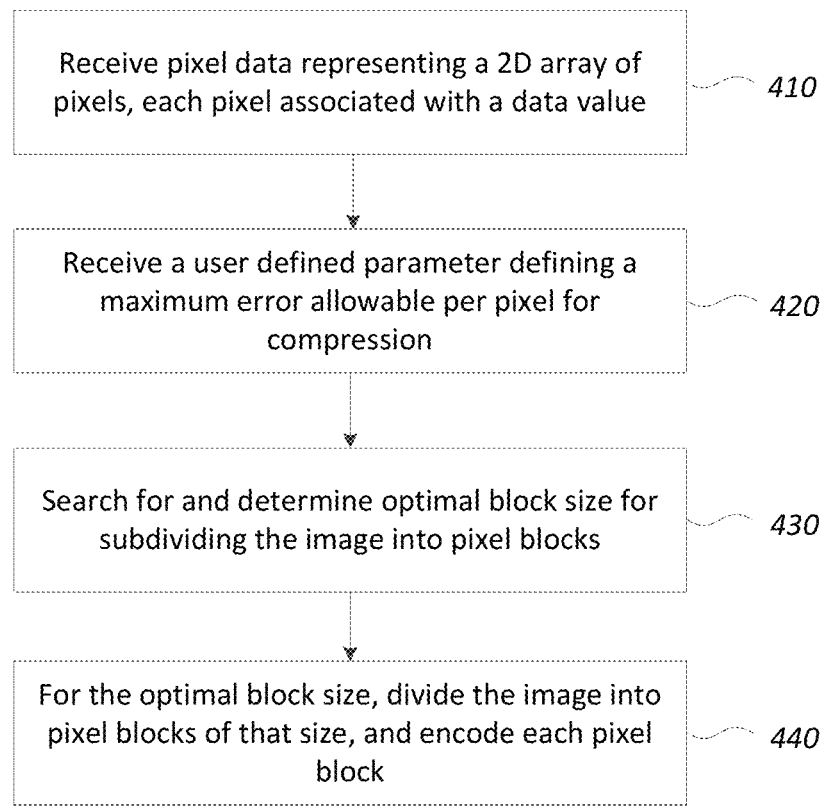
FIG. 4 depicts a simplified flow diagram illustrating aspects of a method of compression, according to embodiments of the invention.

FIG. 4 depicts a simplified flow diagram illustrating aspects of a method 400 of compression, according to embodiments of the invention. The LERC method 400 includes receiving pixel data representing a two-dimensional array of pixels, where each pixel is associated with a data value (410). In some embodiments, the raster data can include scientific raster data (e.g., temperature), multi-spectral imagery, elevation data, etc. It should further be noted that LERC can be extended to three-dimensional voxel grids (e.g., MRI, CT, etc.).

At 420, the LERC method 400 includes receiving a user defined maximum error (i.e., "MaxZError") allowable per pixel. The MaxZError value determines the amount of error introduced when quantizing pixel data values during compression. The user can select a maximum allowable error based on a desired data precision. Allowing greater error will typically yield greater compression ratios and reduced file sizes, and vice versa.

At 430, the method 400 continues with searching for and determining the optimal block size for subdividing the image into pixel blocks, as further described below with respect to FIG. 6. At 440, for the optimal block size, dividing the image into pixel blocks and encoding each pixel block, as further described below with respect to FIG. 5.

To further illustrate the LERC compression method by example, the compression algorithm includes dividing the raster into pixel blocks (e.g., 8×8, 11×11, or larger blocks). The smaller the block, the smaller the value range of the pixel values, resulting in less bits needed per pixel. Each block stores its own data (e.g., min value for that block, the number of bits needed per pixel, etc.). The optimal block size depends on that data and is determined by the compression algorithm. The quantization component of the compression algorithm takes a block of pixels (e.g., 8×8 pixels=64 pixels) and determines the minimum and maximum pixel value in that particular block. Keeping the minimum value as an offset for this block, the 64 pixel values can be quantized based on the specified maximum error allowed (MaxZError) per pixel. As a result, each value can be represented needing only, for instance, 10 bits instead of 32 bits (e.g., as required for floating point numbers). These 64 by 10 bits can be "bit stuffed" into an array of the size needed (e.g., 640 bits or 80 bytes). Some non-limiting, exemplary embodiments of the LERC method are presented below in FIGS. 9A-9E. In certain embodiments, the compression algorithm (i.e., compression processing routine) is not a discrete cosine transform (DCT) or wavelet transform.

Figure 5:
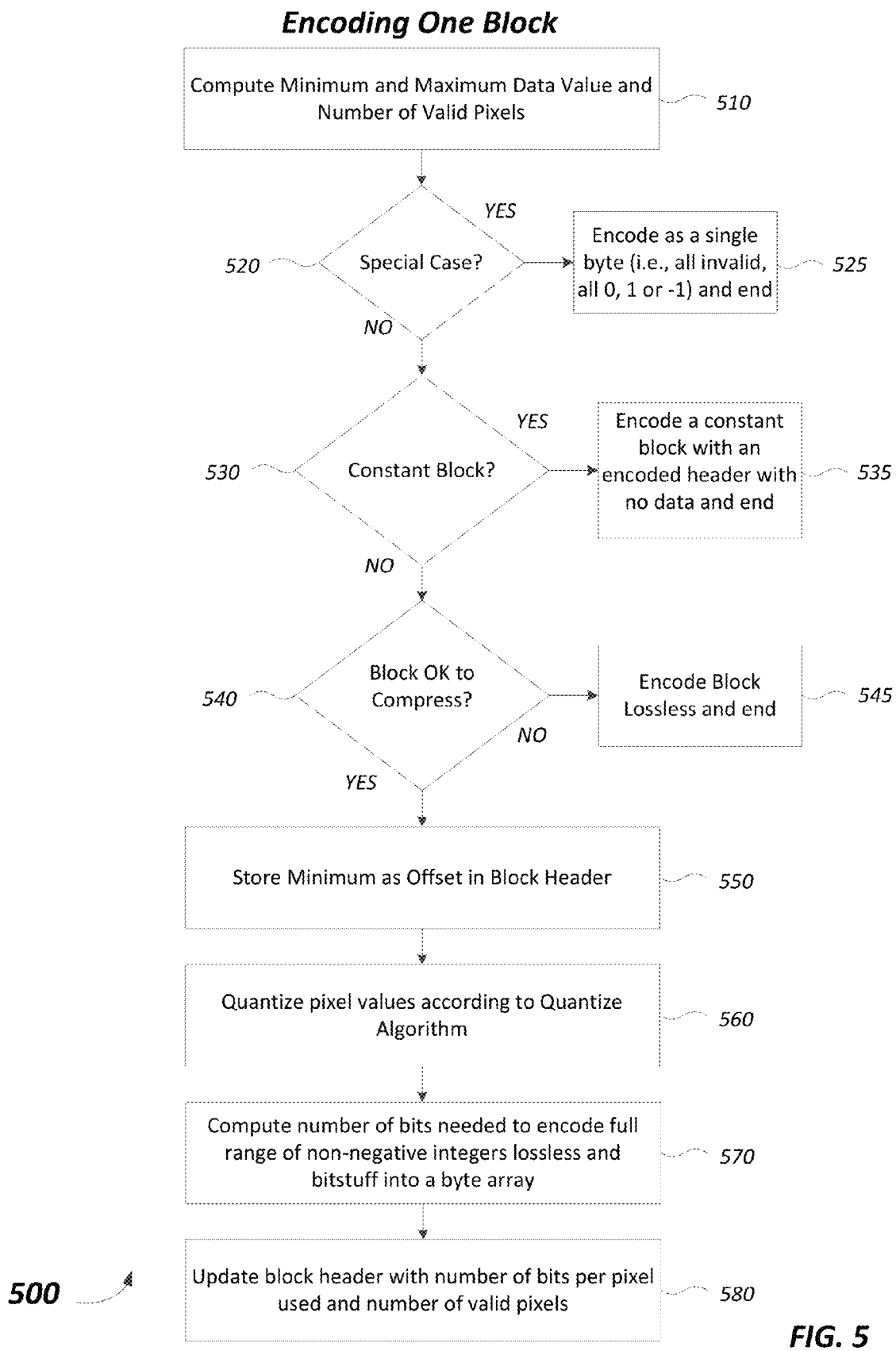
FIG. 5 depicts a simplified flow diagram illustrating aspects of a method of encoding one block in a compression scheme, according to certain embodiments of the invention.

FIG. 5 depicts a simplified flow diagram illustrating aspects of a method 500 of encoding one block in a compression scheme, according to certain embodiments of the invention. The compression method 500 includes computing a minimum and maximum data value in a pixel block and the number of valid pixels (510). At 520, if all of the pixel block data is either invalid, or all 0's, 1's, or −1's, the block is encoded as a single byte (525) and the method ends. At 530, if the pixel block includes a constant block (i.e., all uniform pixel values) that are not all invalid or all 0's, 1's, or −1's, the pixel block is encoded with a header with no data (535) and the method ends. File structures, file headers, block headers, and pixel value headers can be arranged and configured in any suitable format as would be known and appreciated by one of ordinary skill in the art. Some exemplary embodiments of file structures are shown in FIGS. 8A-D.

At 540, the method includes determining whether the pixel block should be encoded uncompressed. This may occur if the MaxZError=0 or very small, as can be determined by equation (1).

$$((\text{Max}-\text{Min})/(2*\text{MaxZError})>2^{28}) \quad (1)$$

According to equation (1), if more than 28 bits per pixel are required to encode the quantized integers, then the block is not compressed and remains as is in float. It should be noted that equation (1) is but one exemplary embodiment and other formulas may be used to determine when LERC compression provides an inadequate compression ratio for a particular application. In such cases, the method further includes encoding the block lossless (545) and ending. Typically, most pixel blocks are suitable for compression. In these cases, the method further includes determining the minimum pixel data value in the pixel block and storing it as an offset in the block header (550). One example of a block header is shown in FIG. 8D, although other header formats may be used. The method further includes quantizing pixel values according to the quantization algorithm (560) shown in equation (2). It should be noted that the quantization process is the only lossy step in the compression algorithm described herein.

$$n(i)=(\text{unsigned int})((x(i)-\text{min})/(2*\text{maxZError})+0.5) \quad (2)$$

In this case, n(i) is a new integer value after quantization and x(i) is the value before quantization. The x(i) value can be float or integer at pixel (i) and n(i) can be unsigned long (e.g., non-negative 32-bit integer). At 570, the LERC method further includes computing the number of bits needed to encode the full range of non-negative integers lossless and bit stuffing the integers into a byte array. In some embodiments, the block header is updated with the number of bits per pixel used and the number of valid pixels (580), as shown in FIG. 8D.

Figure 6:
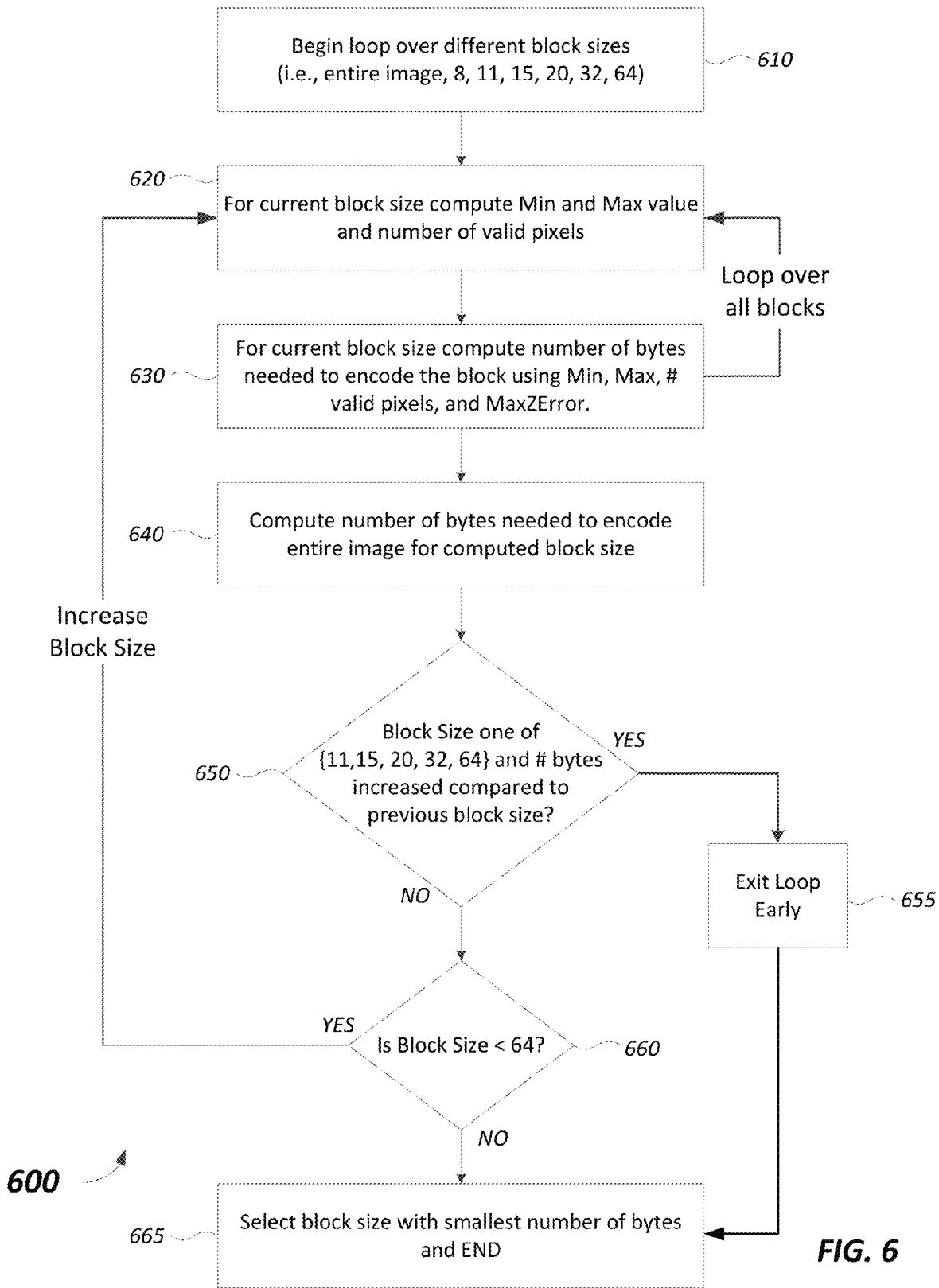
FIG. 6 depicts a simplified flow diagram illustrating aspects of a method of determining an optimal block size for a compression scheme, according to certain embodiments of the invention.

FIG. 6 depicts a simplified flow diagram illustrating aspects of a method 600 of determining an optimal block size for a compression scheme, according to certain embodiments of the invention. The LERC method 600 includes beginning a search loop over successive prospective pixel block sizes (610). For example, the method 600 may begin with successively looping over the entire raster image and subsets thereof. In one non-limiting example, the method 600 may start with the entire raster image and then continuing from the smallest pixel block (e.g., 8×8) and increasing therefrom with each iteration (e.g., pixel block sizes of 8, 11, 15, 20, 32, etc.). In another embodiment, the method may begin by iteratively looping through increasing pixel block sizes starting with a small pixel block and progressively increasing. For each prospective block size, the method further includes computing the minimum (Min) and maximum (Max) pixel data values and the number of valid pixels for that block size (620) for each block in the raster. As described above, the pixel data can include elevation data, temperature data, or any other data associated with one or more coordinates in a raster image.

At 630, the method includes computing the number of bytes needed to encode the current pixel block using each of the Min, Max, the number of valid pixels, and the user defined MaxZError parameters. As shown in FIG. 6, process steps 620 and 630 are performed for each block of the raster for the current block size. At 640, the method continues with computing the number of bytes needed to encode the entire raster image (i.e., all blocks) for the computed block size. For example, a raster image may be large enough to accommodate 36 pixel blocks, each with an 8×8 pixel array. Other cases may accommodate fewer or larger numbers of pixel blocks depending on the size of the raster and/or pixel blocks. At 650, if the block size is one of a number of valid block sizes (e.g., 11, 15, 20, 32, 64) and the number of bytes for that particular block size has increased compared to the previous computed block size, the search loop ends early (655), the block size with the smallest number of bytes is selected (660), and the method ends. At 650, if the block size is one of the number of valid block sizes and the number of bytes for that particular block size has not increased compared to the previous computed block size, the method continues by determining whether the current block size is less than 64×64 pixels (660). If the block size is less than 64, the next higher block size is selected at the method returns to 620. If the current block size is not less than 64 (e.g., is equal to 64×64 pixels), the method continues with selecting the block size utilizing the smallest number of bytes (660).

In summary, the method 600 provides an efficient and systematic approach for determining the optimal block size for a particular raster. In some embodiments, as long as the calculated byte size continues to improve with each successive block size (i.e., require less bytes), the method will continue until the smallest number of bytes is determined. If the byte size for a particular block increases as compared to the previous block, then it may be assumed that the minimum byte size has been crossed and the method can stop. This method may allow the minimum byte size to be determined before actually cycling through every available block size, which may improve the overall efficiency of a system (e.g., processor 1030 of FIG. 10) executing the method 600.

It should be appreciated that the specific steps illustrated in FIG. 6 provides a particular method 600 of compression, according to an embodiment of the present invention. Other sequences of steps may also be performed according to alternative embodiments. In certain embodiments, the method 600 may perform the individual steps in a different order, at the same time, or any other sequence for a particular application. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variation, modification, and alternatives of the method.

Figure 7A:
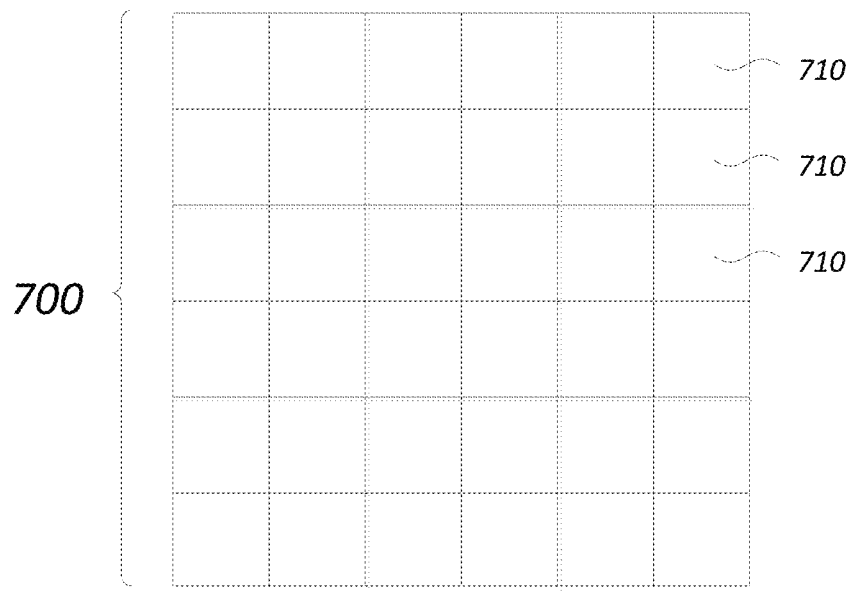
FIG. 7A depicts a tile including a plurality of uniformly sized pixel blocks, according to an embodiment of the invention.
Figure 7B:
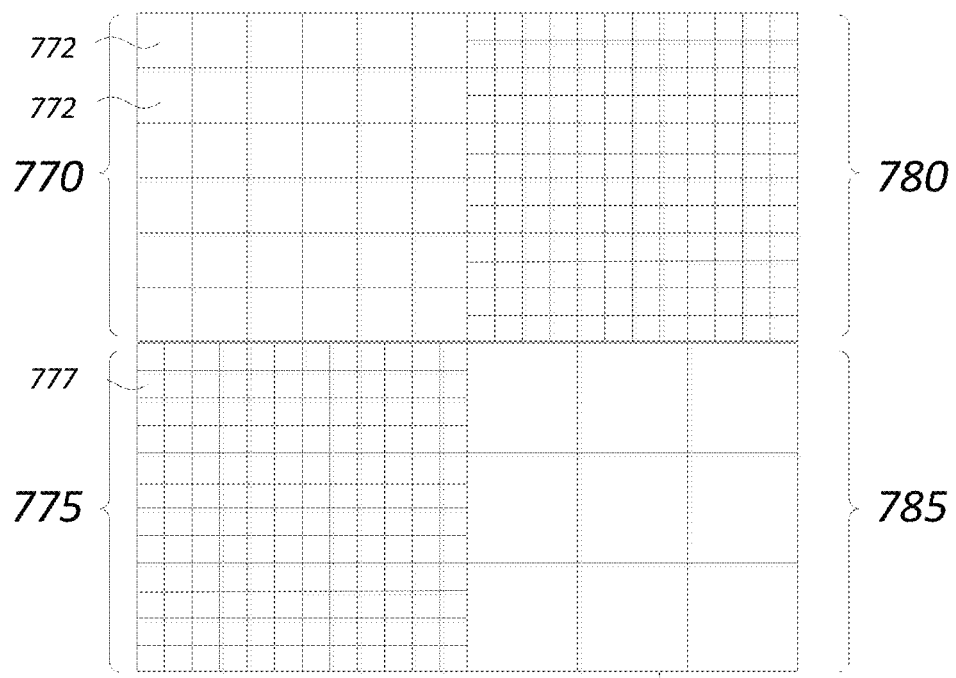
FIG. 7B depicts a raster including a plurality of tiles, according to an embodiment of the invention.

FIG. 7A depicts a tile 700 including a plurality of uniformly sized pixel blocks 710, according to an embodiment of the invention. Each block 710 is uniform and compressed to produce the smallest number of bytes per block, as described above with respect to FIG. 6. FIG. 7B depicts a raster 750 including a plurality of tiles, according to an embodiment of the invention. Some raster images may be very large (e.g., 30K pixels or more) and can be stored as a sequence of tiles (e.g, .tif file), where each tile is encoded separately using different block sizes. Raster 750 includes tile 770, 775, 780, and 785. Each tile can have a different uniform block size generated from a different compression scheme. For example, tile 770 has larger blocks 772 than the blocks 777 of tile 775. In some cases, dividing raster images into multiple tiles can yield smaller overall raster data files. For example, if tile 775 was a LiDAR scan of mountainous terrain, each pixel block would be relatively small to accommodate a large variation in elevation (i.e., min and max pixel data values). Conversely, if tile 785 was a LiDAR scan of a lake, each pixel block would be larger given the little to no variation in elevation, resulting in a small number of pixel blocks. Typically, tiles with large numbers of blocks tend to yield relatively larger data files than tiles with a smaller number of pixel blocks.

File Structures

FIG. 8A depicts a LERC file structure, according to an embodiment of the invention. The LERC file structure can include a file header field, a mask header field, mask data field, a pixel values header field, and pixel values data field as well as their associated formats and sizes. Other data fields can be included in the file structure that may differ in data type or size as required. FIG. 8B depicts a LERC file header, according to an embodiment of the invention. The LERC file header can include a file identifier string, a file version, an image type, an image height in pixels, an image width in pixels, and the user selected MaxZError, including their associated formats and sizes. FIG. 8C depicts a LERC mask or pixel values header, according to an embodiment of the invention. The LERC mask or pixel values header includes the number of blocks in the vertical direction, the number of blocks in the horizontal direction, the number of bytes, and a maximum value in the image (e.g., the or raster), as well as their associated formats and sizes. FIG. 8D depicts a LERC block header, according to an embodiment of the invention. The LERC block header includes the encoding type, the offset, the number of bits per pixel, and the number of valid pixels, including their associated formats and sizes.

Utilizing the File Structures in LERC

In certain embodiments of the invention, the LERC method includes quantizing an array of floating numbers (e.g., elevation data, temperature data, etc.) into an array of unsigned or positive integers using a user-specified maximal quantization error (i.e., MaxZError) and determining the minimum and maximum data value of the float array. The method includes storing the minimum data value as an offset value. In some cases, the offset value is stored as a float number in a block header (FIG. 8D). In some embodiments, the conversion equation is $n(i)=(x(i)-min)/(2*MaxZError)+0.5$. In cases where the MaxZError is too small such that the maximum float array element cannot be represented as a 32 bit unsigned integer (e.g., MaxError=0), the float array is not converted to integer and is stored as a float array uncompressed. It should be noted that the quantization step is the only lossy component in the compression algorithm.

According to some embodiments, the method continues with bit stuffing the array of unsigned integer numbers into an array of unsigned char or bytes. In some aspects, if the maximum array element needs m bits, then the entire array of N elements can be compressed lossless into a byte array of length (N*m+7)/8 using low level bit shifting operations. The method further includes dividing the elevation raster into blocks and encoding each block.

The compression algorithm can automatically determine the optimal block size. Encoding the input raster multiple times using a series of different block sizes and choosing the block size resulting in the smallest file size can require additional file resources and be very time consuming. The LERC method can determine the optimal block size prior to encoding the data by first computing the number of bytes needed to encode each block using various block statistics (e.g., max and min value, number of valid pixels) prior to encoding the block. As such, the method includes computing a resulting file size for a number of different block sizes and selecting the optimal block size to encode the raster a single time.

Typically, the smaller the block size (e.g., 8×8), the more important it becomes to minimize the overhead needed to encode each block. In some embodiments, the block header (FIG. 8D) is defined as {encoding type (byte), offset (variable type), number of bits per element (byte), number of valid pixel (variable type)}. With the variable type, the method dynamically switches to the smallest type that allows representing the information without loss. For example, for the last field of the header, "number of valid pixels," only one byte is needed for block sizes up to 15×15 pixels (15×15=225 pixels and fits into one byte). Larger blocks may require unsigned short (2 bytes). In cases where the entire image can be encoded as one block, an unsigned integer may be utilized. As block sizes increase, the block overhead becomes less significant in the overall compression scheme. The variable type used can be encoded in the highest 2 bits of the byte just before that variable. Similarly, if the offset value is a real float value, it can be encoded as a float (4 bytes). If the offset value is a 16-bit integer (e.g., Digital Terrain Elevation Data (DTED)), it can be encoded as a short (2 bytes). Alternatively, the offset value can be written and encoded as a char (1 byte). Using the two bytes located before the offset and the number of valid pixels, the highest 2 bits can be used to encode the variable type of the following variable, and the lower 6 bits can be used by these two bytes themselves. The number of bits per element can be used to encode the bit depth used for bit stuffing the array of unsigned integers, which is typically 32 bits or less. The first byte of the header (i.e., the encoding type) is encoded to identify whether the block is stored as lossless float, or bit stuffed, and in addition encodes common situations as just one byte. For example, a block of a void (no data) mask being constant (i.e., all valid or all invalid), or an elevation block constant at 0, can be represented by the one byte, allowing frequently occurring blocks to be encoded as a single byte.

In some embodiments, a void or no data mask is encoded first and the elevation values thereafter. The void mask can be represented as binary (e.g., for valid, invalid data), integer (e.g., encode like pixel values with MaxZError=0.5 for lossless encoding), a float raster (e.g., with mask used as a weight kernel), or any desired data structure. In some cases, the void pixel can be set to avoid interpolations at −1 or may be interpolated at 0 with valid pixels set to 1. Alternatively, the data mask can be used as a count (e.g., the number of LiDAR pulses hitting a particular cell), a weight (e.g., float number between 0 and 1), or any other desired data representation. To maintain flexibility, the void mask and elevation raster can be stored as a float raster and can both be compressed using the methods described herein. In each case, the mask is typically encoded lossless. In certain embodiments, if the mask is binary (valid/invalid), which can be the most common case, it can be encoded as follows: Put all bits into a byte array of length ((number of pixels+7)/8) bytes, and run-length encode this array. The array will typically become very small, particularly with large areas of all valid or all invalid pixels. Even without run-length encoding, the mask takes only 1 bit per pixel. In such cases, the binary mask contributes little to the overall data volume and does not typically justify using more expensive or time consuming compression methods.

Before encoding a float raster, the method includes running through different block size configurations and computing both statistics and the number of bytes needed to encode the raster using that particular block size. Some typical block sizes may include {entire raster, 8, 11, 15, 20, 32, 64}. In some embodiments, block sizes greater than 64×64 are not used because at this block size the block overhead becomes negligible and larger blocks typically do not yield better compression output. In some cases it may be advantageous to start with the entire raster to allow for early stopping in special cases (e.g., entire raster is constant, all valid, or all invalid).

As described above, once the optimal block size has been determined, the raster is encoded. In certain embodiments, the method includes encoding single blocks containing outliers as float numbers uncompressed and bit stuffing regular blocks. The variable types can allow for automatic switching from float to integer wherever possible. Typically, the mask containing information identifying valid and invalid pixels is encoded first and only elevation values (or other 'z' data) for valid pixels are encoded. During the decoding process, the mask is typically decoded first in order to determine which pixels have to be filled with the elevation values being decoded.

In certain embodiments, alternatives to bit stuffing may be used to compress the pixel raster. For example, instead of bit stuffing the non-negative integers after quantization, all of the non-negative integers can be collected unchanged in one large array of non-negative integers for all blocks. This will provide the LERC header structure with all block headers for all blocks, but no data therein, as well as one large array with all the non-negative integers from the different quantizations of the entire image. Conventional lossless encoding can be applied to the array of integers (e.g., symbol based encoding schemes (LZW), etc.). It should be noted that this scheme may produce some float number from blocks that were not quantized but passed along uncompressed. While this method can produce significant compression gain, it can involve increased complexity and computation time for both encoding and decoding processes.

Example of LERC Encoding for One Block Using MaxZError=0.01 m

In some embodiments, LERC encoding can be performed using four simplified basic steps including, but not limited to, (1) calculating the basic statistics for a data block; (2) determining how to encode the block using a user defined MaxZError value, (3) determining the number of bits needed and bit stuffing the non-negative integers; and (4) writing the block header. FIG. 9A depicts sample block data 910 for a 4×4 block of pixels, according to an embodiment of the invention. It should be noted that blocks are typically larger than 8×8 pixels, but are shown here as 4×4 pixels for simplicity of description. At step 1, the LERC method includes determining the basic statistics for the data block of FIG. 9A. The minimum value is 1222.2943 and the maximum value is 1280.8725. The number of valid pixels (i.e., non-void pixels) is 12 of 16. The number of invalid pixels (i.e., void pixels) is 4 of 16.

At step 2, the LERC method includes determining whether the pixel block should be encoded uncompressed with a user-input MaxZError of 0.01 m. By using equation (1) above: (Max−Min)/(2*MaxZError)=>(1280.8725−1222.2943)/(2*0.01)=2,928.91. Since this value is less than $2^{28}$, we can quantize the pixel values in data block 910 and expect an acceptable compression ratio. The block is quantized using equation (2) above, where each new pixel value is calculated by: n(i)=(unsigned int)((x(i)−Min)/(2*MaxZError)+0.5), resulting in the new pixel block 920 shown in FIG. 9B. At step (3), the method further includes determining the number of bits needed and bit stuffing these non-negative integers. The number of bits needed can be determine by equation (3):

$$\text{NumBits}=\text{ceil}(\log_2(2929))=12 \quad (3)$$

To represent the number of bits needed another way, $2^{11}<2929<2^{12}$. In this case, 12 bits per number are need to encode all numbers of block 910 lossless. There are 12 valid numbers, resulting in 12×12=144 bits total. As 144/8=18, 18 bytes are needed to encode the entire data block. At step (4), the method includes writing the block header as shown in FIG. 9C. It follows that 7 bytes are needed for the block header. The total number of bytes needed for block 920 can be calculated as 18+7=25 bytes. In this particular case, the header takes too much space with respect to the raw pixel data, which exemplifies the need to work with block sizes of 8×8 pixels or larger.

Example of LERC Encoding for One Block Using MaxZError=1.0 m

Using the same 4×4 pixel block shown in FIG. 9A, the LERC method is performed again using a larger MaxZError (i.e., error threshold) of 1.0 m. Beginning with step (1), the minimum value is 1222.2943 and the maximum value is 1280.8725. The number of valid pixels (i.e., non-void pixels) is 12 of 16. The number of invalid pixels (i.e., void pixels) is 4 of 16. In step (2), the LERC method proceeds with determining whether the pixel block should be encoded uncompressed with a user-input MaxZError of 1.0 m. As By using equation (1) above: (Max−Min)/(2*MaxZError)=> (1280.8725−1222.2943)/(2*1.0)=29.2891. Since this value is less than $2^{28}$, we can quantize the pixel values in data block 910 and expect an acceptable compression ratio. The block is quantized using equation (2) above, where each new pixel value is calculated by: n(i)=(unsigned int)((x(i)−Min)/(2*MaxZError)+0.5), resulting in the new pixel block 940 shown in FIG. 9D. At step (3), the method further includes determining the number of bits needed and bit stuffing these non-negative integers. The number of bits needed can be determine by equation (4):

$$\text{NumBits}=\text{ceil}(\log_2(29))=5 \quad (4)$$

To represent the number of bits needed another way, $2^4<29<2^5$. In this case, 5 bits per number are need to encode all numbers of block 940 lossless. There are 12 valid numbers, resulting in 5×12=60 bits total. As 60/8=7.5, 8 bytes are needed to encode the entire data block. At step (4), the method includes writing the block header as shown in FIG. 9E. It follows that 7 bytes are needed for the block header. The total number of bytes needed for block 920 can be calculated as 8+7=15 bytes.

Figure 10:
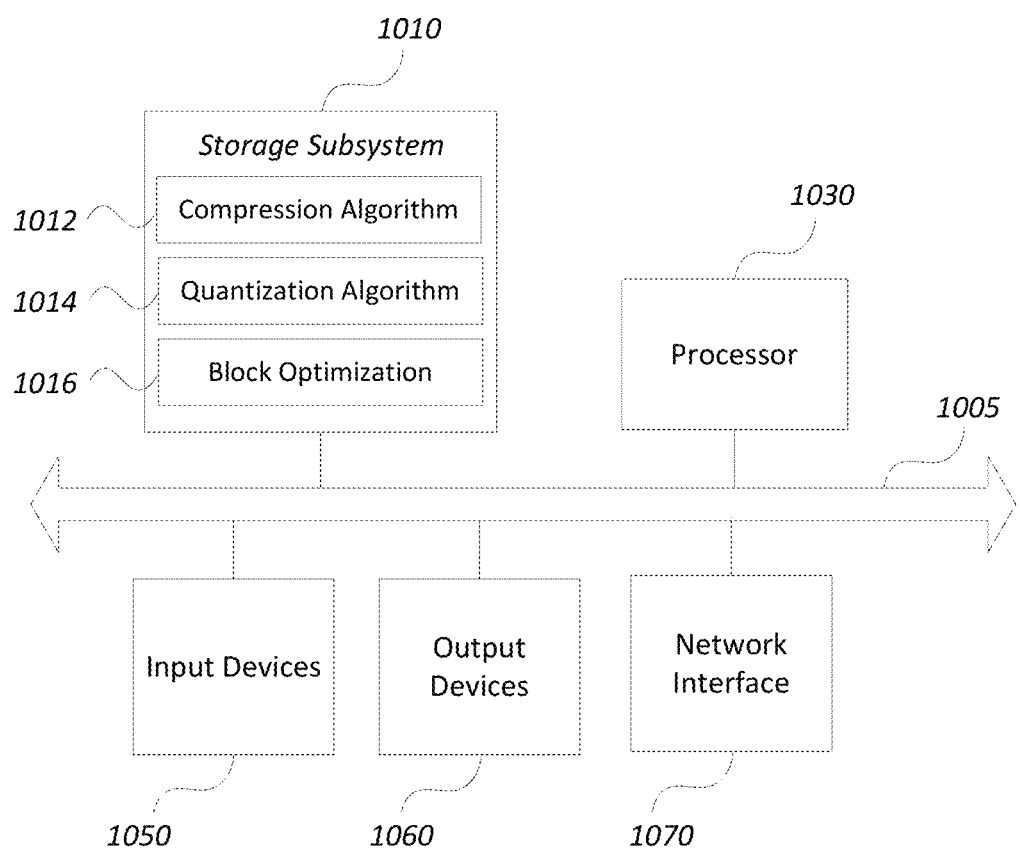
FIG. 10 illustrates a computer system, according to an embodiment of the present invention.

FIG. 10 illustrates a computer system 1000 according to an embodiment of the present invention. The compression methods described herein (e.g., FIGS. 3-6) can be implemented within a computer system such as computer system 1000 shown here. Computer system 1000 can be implemented as any of various computing devices, including, e.g., a desktop or laptop computer, tablet computer, smart phone, personal data assistant (PDA), or any other type of computing device, not limited to any particular form factor. Computer system 1000 can include processing unit(s) 1030, storage subsystem 1010, input devices 1050 (e.g., keyboards, mice, touch-screens, etc.), output devices 1060 (e.g., displays, speakers, tactile output devices, etc.), network interface 1070 (e.g., RF, 4G, EDGE, WiFi, GPS, Ethernet, etc.), and bus 1005 to communicatively couple the various elements of system 1000 to one another.

Processing unit(s) 1030 can include a single processor, multi-core processor, or multiple processors and may execute instructions in hardware, firmware, or software, such as instructions stored in storage subsystem 1010. The storage subsystem 1010 can include various memory units such as a system memory, a read-only memory (ROM), and permanent storage device(s) (e.g., magnetic, solid state, or optical media, flash memory, etc.). The ROM can store static data and instructions required by processing unit(s) 1030 and other modules of the system 1000. The system memory can store some or all of the instructions and data that the processor needs at runtime.

In some embodiments, storage subsystem 1010 can store one or more software programs to be executed by processing unit(s) 1030, such as the compression algorithm 1012, the quantization algorithm 1014, or the block optimization algorithm 1016, as further described above with respect to FIGS. 3-6 and 9A-9E. As mentioned, "software" can refer to sequences of instructions that, when executed by processing unit(s) 1030, cause computer system 1000 to perform certain operations of the software programs. The instructions can be stored as firmware residing in read-only memory and/or applications stored in media storage that can be read into memory for processing by processing unit(s) 1030. Software can be implemented as a single program or a collection of separate programs and can be stored in non-volatile storage and copied in whole or in part to volatile working memory during program execution. From storage subsystem 1010, processing unit(s) 1030 can retrieve program instructions to execute in order to execute various operations (e.g., compression algorithms) described herein.

It will be appreciated that computer system 1000 is illustrative and that variations and modifications are possible. Computer system 1000 can have other capabilities not specifically described here (e.g., mobile phone, global positioning system (GPS), power management, one or more cameras, various connection ports for connecting external devices or accessories, etc.). Further, while computer system 1000 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

It should be noted that the LERC methods described herein (e.g., methods 300, 400, 500, 600, and LERC encoding procedures of FIG. 9A-9E, etc.) can be performed by processing logic that may comprise hardware (e.g., circuitry, dedicate logic, etc.), software (which as is run on a general purpose computing system or a dedicated machine), firmware (embedded software, or any combination thereof. In some embodiments, the various methods described herein can be performed by the processor 1030 of FIG. 10. It should also be appreciated that the specific steps illustrated in FIGS. 3-6 provide aspects of a particular method of compression, according to certain embodiment of the present invention. Other sequences of steps may also be performed according to alternative embodiments. In certain embodiments, the methods may perform their individual steps in a different order, at the same time, or any other sequence for a particular application. Moreover, the individual steps of each method may include multiple sub-steps that may be performed in various sequences as appropriate to the individual step. Furthermore, additional steps may be added or removed depending on the particular applications. One of ordinary skill in the art would recognize and appreciate many variation, modification, and alternatives of the method.

The above disclosure provides examples and aspects relating to various embodiments within the scope of claims, appended hereto or later added in accordance with applicable law. However, these examples are not limiting as to how any disclosed aspect may be implemented, All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, sixth paragraph. In particular, the use of "step of" in the claims herein is not intended to invoke the provisions of 35 U.S.C. §112, sixth paragraph.

What is claimed is:

1. A compression method comprising:
   receiving raster data including a two dimensional (2D) array of pixels, wherein each pixel is associated with a data value;
   receiving a first user defined parameter defining a maximum error allowable per pixel;
   subdividing the 2D array of pixels into a plurality of blocks, wherein each block includes a plurality of pixels;
   determining minimum and maximum data values of the plurality of pixels within each block;
   determining a number of bytes needed to encode each block based on the maximum error allowable per pixel and the minimum and maximum data values for the particular block; and
   encoding each block within the determined number of bytes such that, when decoded, the 2D array of pixels will not deviate from its pre-encoded data values by more than the maximum allowable error per pixel.

2. The method of claim 1 further comprising:
   determining a number of valid pixels in each block, wherein determining the number of bytes needed to encode each block is further based on the number of valid pixels in the particular block.

3. The method of claim 1 wherein the encoding is a no transform compression processing routine.

4. The method of claim 2 wherein the no transform compression processing routine includes quantizing the raster data into an array of unsigned integer values.

5. The method of claim 4 wherein the compression processing routine further comprises bit stuffing the array of unsigned integers into a byte array for each block.

6. A non-transitory computer-readable storage medium comprising a plurality of computer-readable instructions tangibly embodied on the computer-readable storage medium, which, when executed by a data processor, provides a compression method, the plurality of instructions comprising:
   instructions that cause the data processor to receive raster data including a two dimensional (2D) array of pixels, wherein each pixel is associated with a data value;
   instructions that cause the data processor to receive a first user defined parameter defining a maximum error allowable per pixel;
   instructions that cause the data processor to subdivide the 2D array of pixels into a plurality of blocks, wherein each block includes a plurality of pixels;
   instructions that cause the data processor to determine minimum and maximum data values of the plurality of pixels within each block;
   instructions that cause the data processor to determine a number of bytes needed to encode each block based on the maximum error allowable per pixel and the minimum and maximum data values for the particular block; and
   instructions that cause the data processor to encode each block based on the determined number of bytes such that, when decoded, the 2D array of pixels will not deviate from its pre-encoded data values by more than the maximum allowable error per pixel.

7. The method of claim 6 further comprising:
   instructions that cause the data processor to determine a number of valid pixels in each block, wherein determining the number of bytes needed to encode each block is further based on the number of valid pixels in the particular block.

8. The method of claim 6 wherein the encoding is a no transform compression processing routine.

9. The method of claim 8 further comprising instructions that cause the data processor to quantize the raster data into an array of unsigned integer values.

10. The method of claim 9 wherein the compression processing routine further comprises bit stuffing the array of unsigned integers into a byte array for each block.

* * * * *